US007232950B2

(12) United States Patent
Kaneko et al.

(10) Patent No.: US 7,232,950 B2
(45) Date of Patent: Jun. 19, 2007

(54) ELECTRIC CONNECTION BOX

(75) Inventors: Nobutaka Kaneko, Kakegawa (JP); Akemi Maebashi, Kakegawa (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 11/505,926

(22) Filed: Aug. 18, 2006

(65) Prior Publication Data

US 2007/0051526 A1 Mar. 8, 2007

(30) Foreign Application Priority Data

Sep. 2, 2005 (JP) .......................... P2005-255036

(51) Int. Cl.
*H02G 3/08* (2006.01)

(52) U.S. Cl. ........................ 174/50; 220/3.2; 439/76.1; 439/76.2

(58) Field of Classification Search .................. 174/50, 174/53, 58, 57, 135, 59, 17 R, 480, 481, 174/DIG. 34, DIG. 35; 220/3.2, 3.3, 3.8, 220/3.9, 4.02; 439/76.1, 76.2, 949; 361/600, 361/601
See application file for complete search history.

(56) References Cited

U.S. PATENT DOCUMENTS 5,868,583 A * 2/1999 Naitou et al. .............. 439/76.2
6,206,726 B1 3/2001 Takahashi et al.
6,276,652 B1 8/2001 Rieger
6,506,060 B2 * 1/2003 Sumida et al. ............. 439/76.2
6,506,061 B2 * 1/2003 Yuasa et al. ............... 439/76.2
6,747,209 B2 * 6/2004 Uchida et al. .............. 174/135
6,833,503 B2 * 12/2004 Lopez et al. .................. 174/50
7,045,715 B2 * 5/2006 Ono ........................... 174/135

FOREIGN PATENT DOCUMENTS

JP 7-039042 A 7/1995

* cited by examiner

*Primary Examiner*—Angel R. Estrada
(74) *Attorney, Agent, or Firm*—Sughrue Mion, PLLC

(57) ABSTRACT

In an electric connection box, even if accuracy of a relative position between a first screw passage hole and a first screw hole, as well as accuracy of a relative position between a second screw passage hole and a second screw hole, is low, the relative positional relation between the first screw passage hole and the first screw hole, as well as the relative positional relation between the second screw passage hole and the second screw hole, can be adjusted because of the provision of a gap between an outer peripheral surface of a constricted engagement portion of a provisionally-placing projection and a hole-defining peripheral surface of a mounting member at the time of mounting a connection box body on the mounting member so that the passage of a first screw through the first screw passage hole and the first screw hole, as well as the passage of a second screw through the second screw passage hole and the second screw hole, can be easily carried out.

4 Claims, 4 Drawing Sheets

ELECTRIC CONNECTION BOX

BACKGROUND OF THE INVENTION

1. Field of the Invention

This invention relates to an electric connection box (that is, an electric junction block) such as a relay box and a fuse box used in a vehicle such for example as an automobile, and more particularly to an electric connection box provided with a mounting structure for mounting a connection box body of the electric connection box (in which electric parts such as relays and fuses are received) on a mounting member such for example as a vehicle body panel of a vehicle.

2. Related Art

There is known one conventional electric connection box in which the electric connection box is fixed to a bracket (mounting member) by a bolt and a nut while inserting cylindrical retaining pins (retaining projections) into respective retaining holes in the bracket (see JP-A-7-39042 Publication).

For mounting this electric connection box on the bracket, the retaining pins on the electric connection box are mated respectively with the retaining holes in the bracket, and the bolt is inserted into a through hole formed at the electric connection box. Then, when the nut is threaded on the bolt, and is tightened, a slanting surface of the electric connection box abuts against an upper end surface of the bracket. As the nut is tightened, the upper surface of the bracket slides on the slanting surface, and pushes a connection box body upward. As a result, each retaining pin is forcibly fitted into the retaining hole, while elongate protuberances on the retaining pin are crushed. Then, when the nut is completely tightened, the retaining pins are engaged in the respective retaining holes, and a plate portion is fixed to the bracket by the bolt and nut.

In this electric connection box, merely by rotating the nut, the connection box body, while pushed up, can be turned toward the bracket, and besides the retaining pins can be forcibly fitted into the respective retaining holes. Therefore, the connection box body can be easily mounted on the bracket, so that the efficiency of the mounting operation can be enhanced.

By the way, in the case where a pair of bolt-fastening through holes are provided at each of the above electric connection box and the bracket, there is a possibility that because of this structure (in which the retaining pins are forcibly fitted (or press-fitted) into the respective retaining holes), it becomes difficult to mount the electric connection box on the bracket if accuracy of a relative position between each bolt-fastening through hole of the electric connection box and the corresponding bolt-fastening through hole of the bracket is low (that is, a dimensional tolerance is large).

SUMMARY OF THE INVENTION

This invention has been made in view of the above circumstances, and an object of the invention is to provide an electric connection box in which the efficiency of an operation for mounting the electric connection box on a mounting member can be enhanced, thereby reducing time required for mounting the electric connection box on the mounting member.

The above object has been achieved by an electric connection box of the present invention having features recited in the following Paragraphs (1) to (4).

(1) An electric connection box characterized in that the electric connection box comprises:

a connection box body;

a provisionally-placing projection formed on an outer surface of the connection box body;

a first mounting portion which has a first screw passage hole, and is formed on the outer surface; and a second mounting portion which has a second screw passage hole, and is formed on the outer surface;

wherein the provisionally-placing projection is inserted in a provisionally-placing hole in a mounting member, and the first screw is passed through the first screw passage hole and a first screw hole in the mounting member, while the second screw is passed through the second screw passage hole and a second screw hole in the mounting member, thereby mounting the connection box body on the mounting member; and the provisionally-placing projection has a constricted engagement portion; and when the connection box body is to be mounted on the mounting member, the engagement portion is disposed such that its outer peripheral surface is surrounded by a hole-defining peripheral surface of the mounting member defining the provisionally-placing hole, and a gap is formed between the engagement portion and the hole-defining peripheral surface.

(2) The electric connection box of the above Paragraph (1) is further characterized in that the provisionally-placing projection is constricted at the engagement portion over an entire periphery thereof.

(3) The electric connection box of the above Paragraph (1) or Paragraph (2) is further characterized in that a direction of passing of the first screw passage hole and the first screw hole intersects a direction of passing of the second screw passage hole and the second screw hole.

(4) The electric connection box of any one of the above Paragraphs (1) to (3) is further characterized in that the mounting member includes a first mounting member having the first screw hole, and a second mounting member having the second screw hole, and the first and second mounting members are separate from each other.

In the electric connection box of the construction of the above Paragraph (1), even if accuracy of a relative position between the first screw passage hole and the first screw hole, as well as accuracy of a relative position between the second screw passage hole and the second screw hole, is low (that is, a dimensional tolerance is large), the relative positional relation between the first screw passage hole and the first screw hole, as well as the relative positional relation between the second screw passage hole and the second screw hole, can be adjusted because of the provision of the gap between the outer peripheral surface of the constricted engagement portion of the provisionally-placing projection and the hole-defining peripheral surface of the mounting member at the time of mounting the connection box body on the mounting member so that the passage of the first screw through the first screw passage hole and the first screw hole, as well as the passage of the second screw through the second screw passage hole and the second screw hole, can be easily carried out. Furthermore, in the electric connection box of the construction of the above Paragraph (1), before passing the first screw through the first screw passage hole and the first screw hole and also before passing the second screw through the second screw passage hole and the second screw hole, the engagement portion is engaged with the hole-defining peripheral surface, and in other words, the connection box body can be provisionally placed on the mounting member, and this is convenient.

In the electric connection box of the construction of the above Paragraph (2), the provisionally-placing projection is constricted at the engagement portion over the entire periphery thereof, and therefore the provisionally-placing projection is allowed to move within the provisionally-placing hole in all directions intersecting the direction of projecting of the provisionally-placing projection from the mounting member. Therefore, the relative positional relation between the first screw passage hole and the first screw hole, as well as the relative positional relation between the second screw passage hole and the second screw hole, can be easily adjusted.

In the electric connection box of the construction of the above Paragraph (3), even in the case where the direction of passing of the first screw passage hole and the first screw hole intersects the direction of passing of the second screw passage hole and the second screw hole, the connection box body can be easily mounted on the mounting member.

In the electric connection box of the construction of the above Paragraph (4), even in the case where accuracy of the relative position between the first screw passage hole and the first screw hole, as well as accuracy of the relative position between the second screw passage hole and the second screw hole, cannot be expected (that is, the mounting condition is bad) as is the case where the mounting member includes the separate first and second mounting members respectively having the first screw hole and the second screw hole, the relative positional relation between the first screw passage hole and the first screw hole, as well as the relative positional relation between the second screw passage hole and the second screw hole, can be easily adjusted through the constricted engagement portion of the provisionally-placing projection. In this case, when the engagement portion is formed such that the depth of the outer peripheral surface of the engagement portion in the direction of projecting of the provisionally-placing projection from the mounting member is made larger as much as possible than the depth of the hole-defining peripheral surface of the mounting member in the same projecting direction, the range of adjustment of the relative positional relation between the first screw passage hole and the first screw hole, as well as the range of adjustment of the relative positional relation between the second screw passage hole and the second screw hole, can be increased, and therefore this is preferable.

In the present invention, the efficiency of the operation for mounting the electric connection box on the mounting member can be enhanced, thereby reducing time required for mounting the electric connection box on the mounting member.

The present invention has been briefly described above. Details of the invention will become more manifest upon reading the following Section "DETAILED DESCRIPTION OF THE PREFERRED EMBODIMENTS" with reference to the accompanying drawings.

DETAILED DESCRIPTION OF THE PREFERRED EMBODIMENTS

A preferred embodiment of the present invention will now be described in detail with reference to FIGS. 1 to 6.

Figure 1:
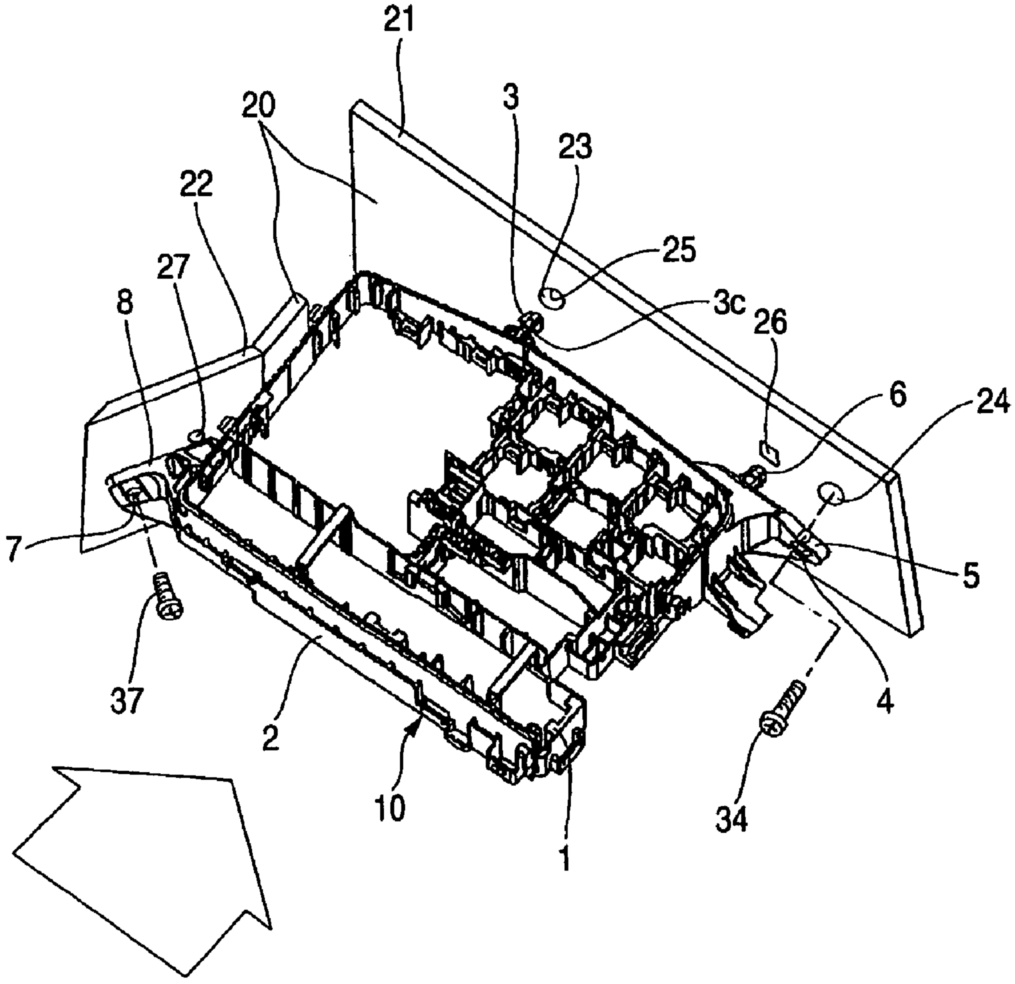
FIG. 1 is a perspective view for explaining a mounting structure for mounting one preferred embodiment of an electric connection box of the present invention on a mounting member.
Figure 2:
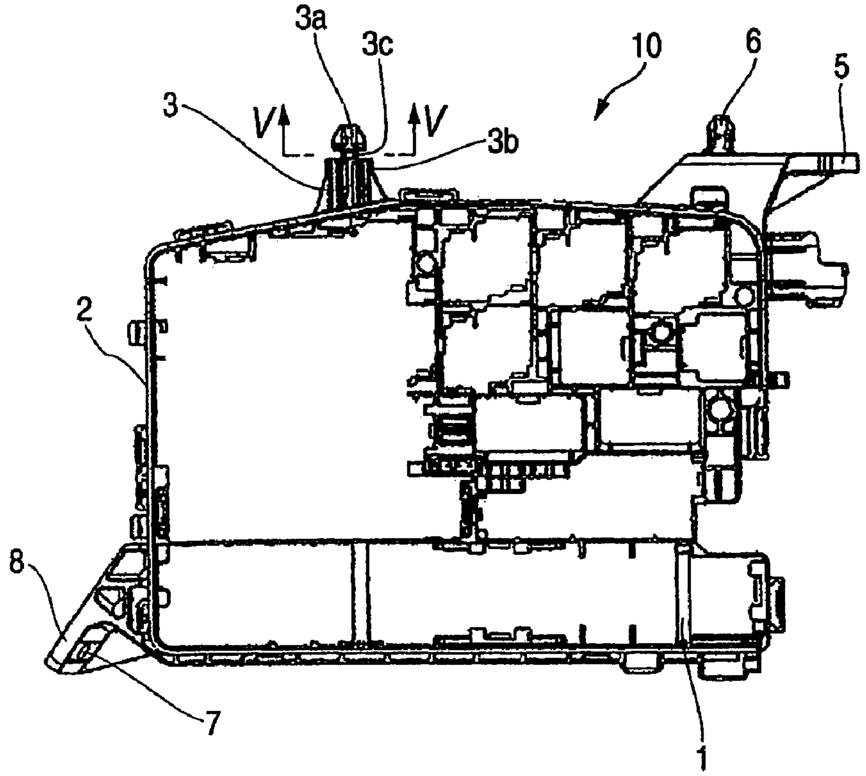
FIG. 2 is a top plan view of a connection box body of the electric connection box of this embodiment.
Figure 3:
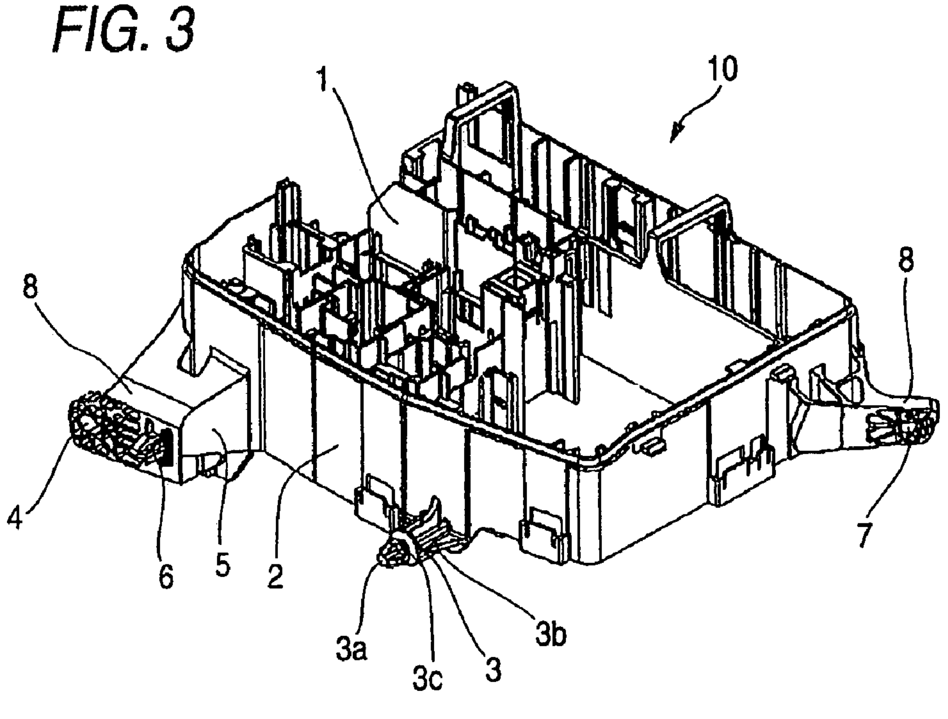
FIG. 3 is a perspective view of the connection box body of FIG. 2, mainly showing a provisionally-placing projection formed on an outer peripheral surface of the connection box body, a first mounting portion formed on the outer peripheral surface and having a first screw passage hole, and a second mounting portion formed on the outer peripheral surface and having a second screw passage hole.
Figure 4:
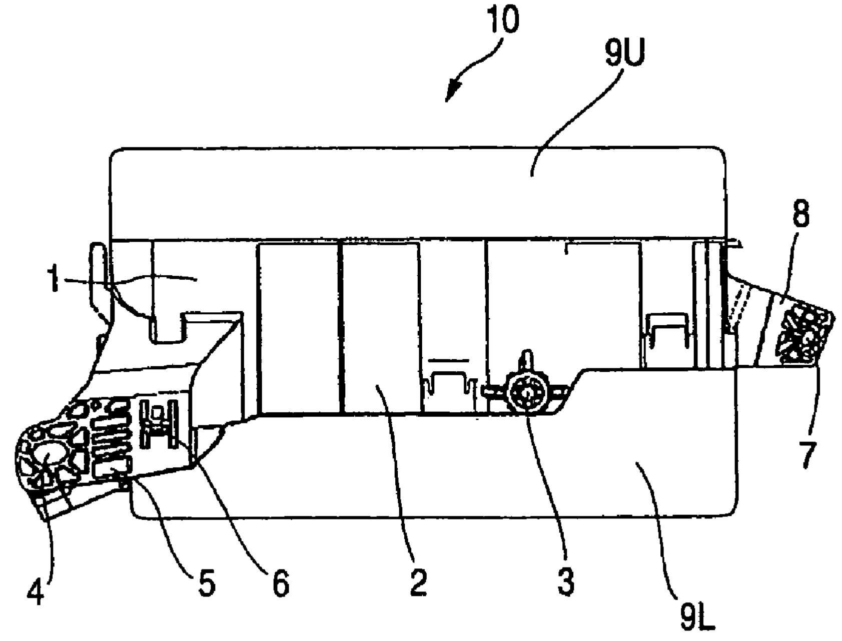
FIG. 4 is a side-elevational view of the electric connection box having upper and lower covers attached to the connection box body.
Figure 5:
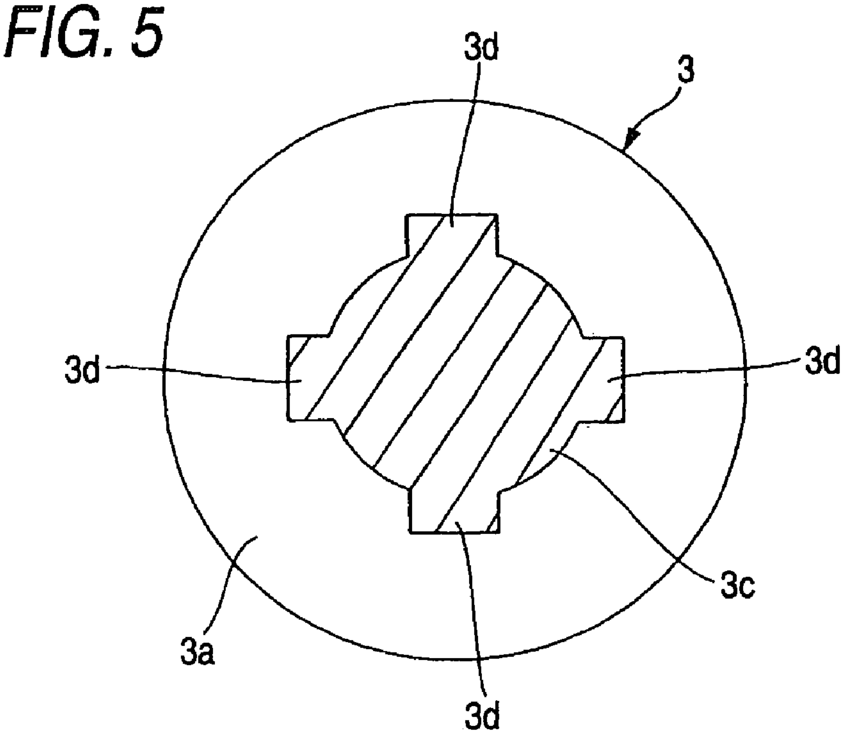
FIG. 5 is a cross-sectional view taken along the line V-V of FIG. 2.
Figure 6:
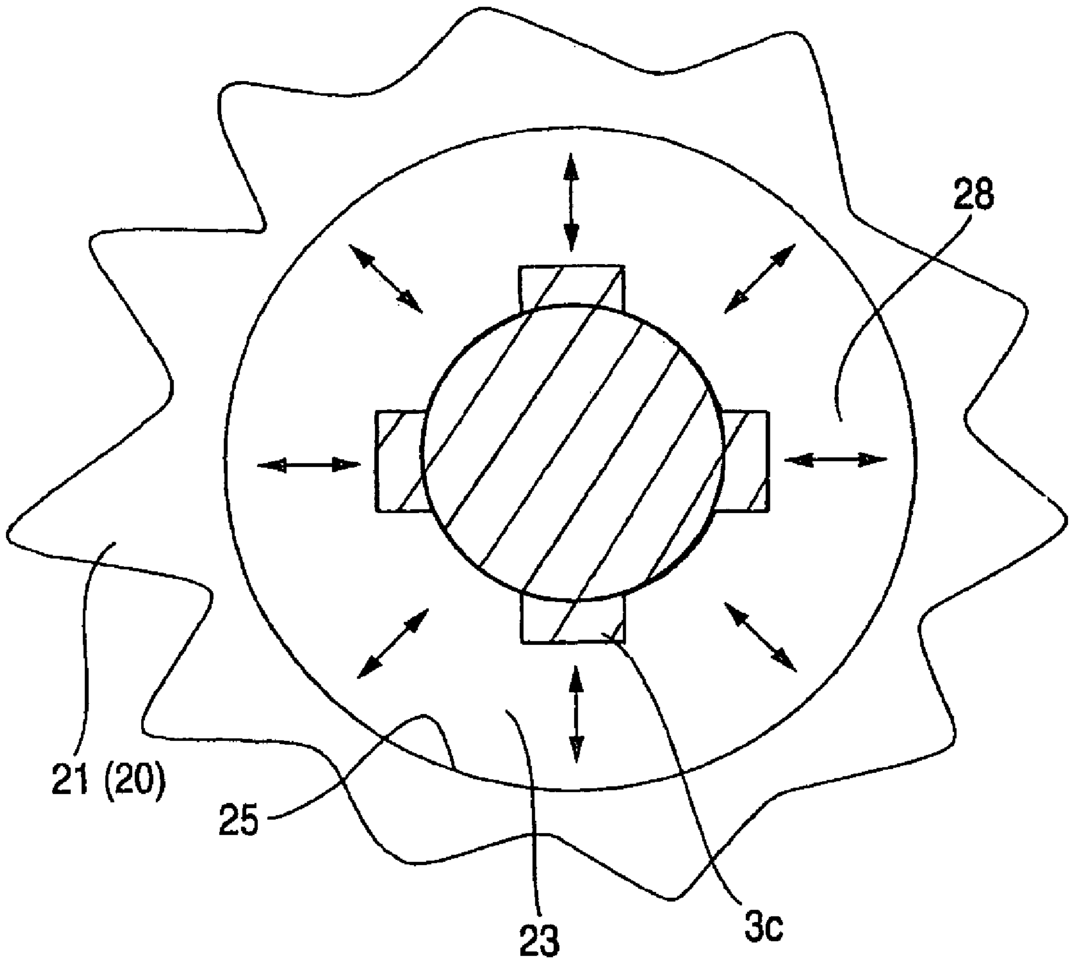
FIG. 6 is a cross-sectional view of a constricted engagement portion of the provisionally-placing projection, showing an operation of this engagement portion.

FIG. 1 is a perspective view for explaining a mounting structure for mounting one preferred embodiment of an electric connection box of the invention on a mounting member, FIG. 2 is a top plan view of a connection box body of the electric connection box of this embodiment, FIG. 3 is a perspective view of the connection box body of FIG. 2, mainly showing a provisionally-placing projection formed on an outer peripheral surface of the connection box body, a first mounting portion formed on the outer peripheral surface and having a first screw passage hole, and a second mounting portion formed on the outer peripheral surface and having a second screw passage hole, FIG. 4 is a side-elevational view of the electric connection box having upper and lower covers attached to the connection box body, FIG. 5 is a cross-sectional view taken along the line V-V of FIG. 2, and FIG. 6 is a cross-sectional view of a constricted engagement portion of the provisionally-placing projection, showing an operation of this engagement portion.

As shown in FIGS. 1 to 4, the electric connection box 10 of this embodiment includes the connection box body 1, the provisionally-placing projection 3 formed on the outer peripheral surface 2 of the connection box body 1, the first mounting portion 5 having the first screw passage hole 4 and formed on the outer peripheral surface 2 of the connection box body 1, a pivot projection 6 formed on the first mounting portion 5, the second mounting portion 8 having the second screw passage hole 7 and formed on the outer peripheral surface 2 of the connection box body 1, the upper cover 9U attached to an upper portion of the connection box body 1, and the lower cover 9L attached to a lower portion of the connection box body 1.

In this electric connection box 10, the upper cover 9U and the lower cover 9L are attached to the connection box body 1 as shown in FIG. 4, and then the provisionally-placing projection 3 is inserted into a provisionally-placing hole 23 in the mounting member 20 such as a vehicle body panel, and in this condition a first screw 34 is passed through the first screw passage hole 4 and a first screw hole 24 in the mounting member 20, and is threaded in the first screw hole 24, while a second screw 37 is passed through the second screw passage hole 7 and a second screw hole 27 in the mounting member 20, and is threaded in the second screw hole 27, and by doing so, the electric connection box 10 is mounted on the mounting member 20.

There can be adopted an arrangement in which the first screw 34 and the second screw 37 are merely passed respectively through the first screw hole 24 and the second screw hole 27, and then are threaded in nuts (not shown), respectively, thereby mounting the electric connection box 10 on the mounting member 20. As described above, the pivot projection 6 is formed on the connection box body 1, and this pivot projection 6 is engaged in a pivot hole 26, and the electric connection box 10 is turned or angularly moved about this pivot projection 6 so that the provisionally-placing projection 3 can be inserted into the provisionally-placing hole 23. However, the provision of the pivot projection 6 and pivot hole 26 may be omitted.

The provisionally-placing projection 3 includes an insertion distal end portion 3*a*, a proximal end portion 3*b*, and the constricted engagement portion 3*c* formed between the insertion distal end portion 3*a* and the proximal end portion 3*b*. This provisionally-placing projection 3 is constricted at the engagement portion 3*c* over an entire periphery thereof as shown in FIG. 5. The engagement portion 3*c* includes a cylindrical body, and four ribs (elongate protuberances) 3*d* formed on an outer peripheral surface of this cylindrical body. The four ribs (elongate protuberances) 3*d* are provided as reinforcing portions in order to avoid a situation in which cavities are formed (that is, bubble portions are formed) in the molding, so that the desired shape can not be obtained by molding because of shrinkage (molding sink).

When the connection box body 1 is to be mounted on the mounting member 20, the engagement portion 3*c* is disposed such that its outer peripheral surface is surrounded by a hole-defining peripheral surface 25 of the mounting member 20 defining the provisionally-placing hole 23, and a gap 28 is formed between the engagement portion 3*c* and the hole-defining peripheral surface 25 as shown in FIG. 6. The engagement portion 3*c* is formed such that a depth of the outer peripheral surface of the engagement portion 3*c* in a direction of projecting of the provisionally-placing projection 3 from the mounting member 20 is equal to or larger than a depth of the hole-defining peripheral surface 25 of the mounting member 20 in the same projecting direction.

The direction of passing of the first screw passage hole 4 and the first screw hole 24 (respectively through the first mounting portion 5 and the mounting member 20) intersects the direction of passing of the second screw passage hole 7 and the second screw hole 27 (respectively through the second mounting portion 8 and the mounting member 20). The mounting member 20 includes a first mounting member 21 having the provisionally-placing hole 23, the pivot hole 26 and the first screw hole 24, and a second mounting member 22 having the second screw hole 27. The first mounting member 21 and the second mounting member 22 are separate from each other. However, the mounting member 20 can be of an integral construction in which the first and second mounting members 21 and 22 are not separate from each other, but are formed integrally with each other.

In the electric connection box 10, even if accuracy of a relative position between the first screw passage hole 4 and the first screw hole 24, as well as accuracy of a relative position between the second screw passage hole 7 and the second screw hole 27, is low (that is, a dimensional tolerance is large), the relative positional relation between the first screw passage hole 4 and the first screw hole 24, as well as the relative positional relation between the second screw passage hole 7 and the second screw hole 27, can be adjusted because of the provision of the gap 28 between the outer peripheral surface of the constricted engagement portion 3*c* of the provisionally-placing projection 3 and the hole-defining peripheral surface 25 of the mounting member 20 at the time of mounting the connection box body 1 on the mounting member 20 so that the passage of the first screw 34 through the first screw passage hole 4 and the first screw hole 24, as well as the passage of the second screw 37 through the second screw passage hole 7 and the second screw hole 27, can be easily carried out.

In the electric connection box 10, before passing the first screw 34 through the first screw passage hole 4 and the first screw hole 24 and also before passing the second screw 37 through the second screw passage hole 7 and the second screw hole 27, the engagement portion 3*c* is engaged with the hole-defining peripheral surface 25, and in other words, the connection box body 1 can be provisionally placed on the mounting member 20, and this is convenient.

Furthermore, in the electric connection box 10, the provisionally-placing projection 3 is constricted at the engagement portion 3*c* over the entire periphery thereof, and therefore the provisionally-placing projection 3 is allowed to move within the provisionally-placing hole 23 in all directions intersecting the direction of projecting of the provisionally-placing projection 3 from the mounting member 20 as shown in FIG. 6. Therefore, the relative positional relation between the first screw passage hole 4 and the first screw hole 24, as well as the relative positional relation between the second screw passage hole 7 and the second screw hole 27, can be easily adjusted.

Furthermore, in the electric connection box 10, even in the case where the direction of passing of the first screw passage hole 4 and the first screw hole 24 intersects the direction of passing of the second screw passage hole 7 and the second screw hole 27 as shown in FIG. 1, the connection box body can be easily mounted on the mounting member 20.

Furthermore, in the electric connection box 10, even in the case where accuracy of the relative position between the first screw passage hole 4 and the first screw hole 24, as well as accuracy of the relative position between the second screw passage hole 7 and the second screw hole 27, can not be expected (that is, the mounting condition is bad) as is the case where the mounting member 20 includes the separate first and second mounting members 21 and 22 respectively having the first screw hole 24 and the second screw hole 27 as shown in FIG. 1, the relative positional relation between the first screw passage hole 4 and the first screw hole 24, as well as the relative positional relation between the second screw passage hole 7 and the second screw hole 27, can be easily adjusted through the constricted engagement portion 3*c* of the provisionally-placing projection 3. In this case, when the engagement portion 3*c* is formed such that the depth of the outer peripheral surface of the engagement portion 3*c* in the direction of projecting of the provisionally-placing projection 3 from the mounting member 20 is made larger as much as possible than the depth of the hole-defining peripheral surface 25 of the mounting member 20 in the same projecting direction, the range of adjustment of the relative positional relation between the first screw passage hole 4 and the first screw hole 24, as well as the range of adjustment of the relative positional relation between the second screw passage hole 7 and the second screw hole 27, can be increased, and therefore this is preferable.

The present invention is not limited to the above embodiment, and suitable modifications, improvements, etc., can be made. Furthermore, the material, shape, dimensions, numerical value, form, number, disposition, etc., of each of the constituent elements of the above embodiment are arbitrary, and are not limited in so far as the invention can be achieved.

For example, in the above embodiment, the provisionally-placing projection 3 is constricted at the engagement portion 3*c* over the entire periphery thereof, and the engagement portion 3*c* includes the cylindrical body having the four ribs (elongate protuberances) formed on the outer peripheral surface thereof. However, the provisionally-placing projection 3 is not limited to this configuration, and the provisionally-placing projection 3 can be constricted at the engagement portion 3*c* at part of the outer periphery thereof. Furthermore, the cross-sectional shape of the engagement portion 3*c* is not limited to the shape shown in FIG. 5, but can take any other suitable shape such for example as a square shape, a triangular shape, a star-shape, a circular shape and an oval shape.

In the present invention, the efficiency of the operation for mounting the electric connection box on the mounting member can be enhanced, and therefore the time required for mounting the electric connection box on the mounting member can be reduced. Therefore, the invention is useful for the type of electric connection box (such for example as a relay box and a fuse box) used in a vehicle such as an automobile.

What is claimed is:

1. An electric connection box comprising:

a connection box body;

a provisionally-placing projection formed on an outer surface of said connection box body;

a first mounting portion which has a first screw passage hole, and is formed on said outer surface; and a second mounting portion which has a second screw passage hole, and is formed on said outer surface;

wherein said provisionally-placing projection is inserted in a provisionally-placing hole in a mounting member, and a first screw is passed through said first screw passage hole and a first screw hole in said mounting member, while a second screw is passed through said second screw passage hole and a second screw hole in said mounting member, thereby mounting said connection box body on said mounting member; and said provisionally-placing projection has a constricted engagement portion; and when said connection box body is to be mounted on said mounting member, said engagement portion is disposed such that its outer peripheral surface is surrounded by a hole-defining peripheral surface of said mounting member defining said provisionally-placing hole, and a gap is formed between said engagement portion and said hole-defining peripheral surface.

2. An electric connection box according to claim 1, wherein said provisionally-placing projection is constricted at said engagement portion over an entire periphery thereof.

3. An electric connection box according to claim 1, characterized in that a direction of passing of said first screw passage hole and said first screw hole intersects a direction of passing of said second screw passage hole and said second screw hole.

4. An electric connection box according to claim 1, wherein said mounting member includes a first mounting member having said first screw hole, and a second mounting member having said second screw hole, and said first and second mounting members are separate from each other.

* * * * *